L. W. BUGBEE.
GOGGLES.
APPLICATION FILED JULY 9, 1915.
1,156,389. Patented Oct. 12, 1915.
Fig. I.
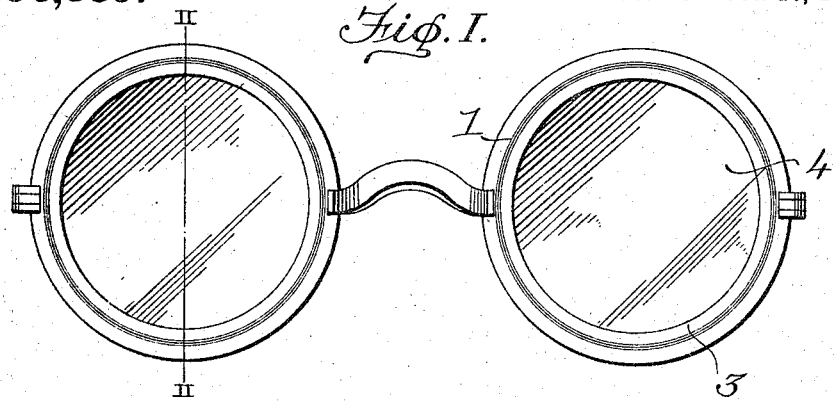
Fig. II.       Fig. III.       Fig. IV.
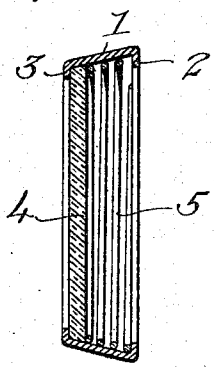    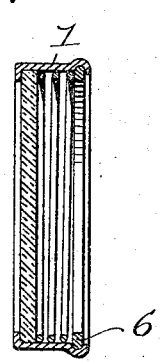    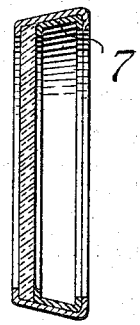
Fig. V.       Fig. VI.       Fig. VII.
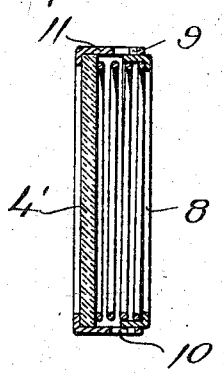    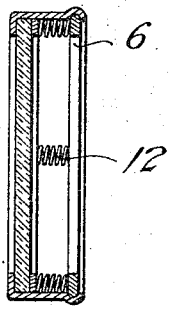    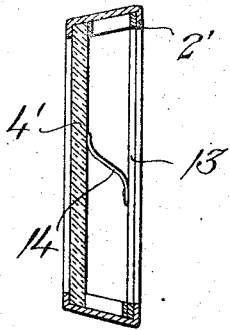
WITNESSES:
Joseph J. Demers
Carroll K. Bailey
INVENTOR
Lucian W. Bugbee,
BY
H. H. Styll & H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS.

GOGGLES.

1,156,389.  Specification of Letters Patent.  Patented Oct. 12, 1915.

Application filed July 9, 1915. Serial No. 39,015.

*To all whom it may concern:*

Be it known that I, LUCIAN W. BUGBEE, a citizen of the United States, residing in Southbridge, in the county of Worcester and State of Massachusetts, have invented certain new and useful Improvements in Goggles, of which the following is a specification.

This invention relates to eye protectors, and has particular reference to an improved form of goggle which will resist shocks and exclude wind, dust, grit, etc., from the eyes, and which will relieve to a minimum the possibility of injury to the eyes from flying chips, cinders or the like thrown with force from various sources.

The invention consists in the provision of safety means in the form of a yieldably supported lens, whereby liability of breakage of the same upon being struck by flying particles of matter is reduced to a minimum and whereby any irritation to the wearer of the goggles due to the constant assault of foreign particles of matter against the protector is effectively prevented.

A further object is to provide a structure accomplishing the foregoing objects, which will be exceedingly simple, cheap and easy to manufacture.

With the foregoing and other objects in view the invention consists in the novel features of construction, combination and arrangement of parts, as will be hereinafter more fully described, illustrated in the accompanying drawings, and claimed.

In the drawings: Figure I is a front elevation of an eye protector constructed in accordance with the invention. Fig. II is a central transverse sectional view through one of the eye cups upon the line II—II of Fig. I. Fig. III is a view similar to Fig. II illustrating a slightly modified form of protector. Fig. IV is a similar view of a further slightly modified form of protector. Fig. V is a similar view of still another modified form of protector. Fig. VI is a similar view illustrating a further slightly modified form of protector. Fig. VII is a similar view of still another modified form of protector.

Referring to the drawings, wherein are illustrated certain preferred forms of my invention, the numeral 1 designates the substantially frusto-conically shaped frame or cup of any suitable or preferred material, which is provided with the inner and outer inturned flanges 2 and 3, respectively. By so constructing the cup the lens 4 may be passed through the opening in the inner portion thereof, and may then be engaged against the inner face of the flange 3 so that its outward movement will be prevented. A coil spring 5 preferably conically wound, is arranged between the inner face of the flange 2 and the inner edge of the lens and normally acts to hold the lens in firm engagement with the flange 3. By thus yieldably supporting the lens within the frame it will be apparent that should the same be struck a severe blow, as by a chip of flying steel or the like from a machine in operation, the spring 5 will yield and permit of rearward movement of the lens and will act in the nature of a shock absorber and thus minimize the possibility of breakage of the lens. It should also be apparent that by the provision of a yieldably supported lens as shown irritation to the wearer of a protector subject to constant assault from any source is obviated due to the nature of the lens support which takes up the shock caused by the assault and relieves the face therefrom.

In Fig. III of the drawings the cup 1 has been shown as provided with straight instead of tapering walls, as in Fig. II, and has also been shown as provided with the detachable ring 6 instead of the inturned flange 2, the said ring 6 being adapted to be snapped within an annular groove formed adjacent the rear edge of the frame. The lens in this form of my invention is yieldably supported in the manner described in connection with Fig. II.

By reference to Fig. III of the drawings it will be noted that if desired a transparent plate of glass or the like could be substituted in place of the ring 6 and, therefore, as I may desire to make use of such a structure I do not wish to be limited to the construction illustrated.

In Fig. IV of the drawings the frame or cup is of the same construction as shown in Fig. II, and the operation of the lens is the same with the exception that a suitable yieldable material 7, such as rubber or the like, is arranged between the lens and the inner inturned flange in place of the coil spring 5.

By reference to Fig. V of the drawings it will be seen that an inner relatively stationary member 8 has been provided having pins 9 formed upon its outer face, which are journaled in slots 10 formed in a lens supporting member 11, into which the member 8 telescopes. By this arrangement it will be seen that a blow against the lens 4' will cause inward movement of the member 11 relative to the member 8 should the lens be secured to the member 11, or should the lens be slidably mounted in the member 11, the pin and slot connection between the parts of the same may be dispensed with and the frame simply formed in two parts to facilitate assemblage of the parts.

In Fig. VI of the drawings, I have illustrated a frame of substantially the same construction as shown in Fig. III, that is, the bearing ring for the inner end of the yieldable supporting means for the lens has been shown in the form of a ring adapted to be snapped into an annular recess in the frame. In place, however, of the coil spring for yieldably supporting the lens I here make use of a plurality of small spiral springs arranged between the ring and the lens. These springs 12 being carried upon a second ring which bears against the inner face of the lens. If desired, however, this second ring may be dispensed with and the spring may be carried upon the ring 6', and it will be understood that as in Fig. III this second ring may be in the form of a glass plate if desired.

In Fig. VII of the drawings I have illustrated the tapered casing as being provided with a ring 13 bearing against the inner face of the inturned flange 2' and as being provided with spring tongues 14 which engage with the inner face of the lens 4' and yieldably support the same. The spring tongues 14 have been shown as being of separate pieces of material from the ring 13, but it will be understood that if desired the tongues and ring may be formed integrally with the tongues struck out from the ring.

It will be noted that in each of the forms of my invention I have illustrated means whereby the lens is permitted to give should the same be subjected to a blow from any source, thus reducing to a minimum the liability of breakage of the lens and providing for the comfort of the person wearing the mounting.

From the foregoing description taken in connection with the accompanying drawings, it is thought that the construction, operation and advantages of my improved eye protector should be readily understood, and while I have herein shown and described certain specific embodiments of my invention I do not wish to be limited thereto except to such limitations as the claims may import.

I claim:

1. In an eye protector of the character set forth, the combination with a frame, of a lens loosely mounted in the frame, and means for yieldingly holding the lens at the front of the frame.

2. In an eye protector, the combination with a frame, of a lens mounted in the frame, and a compressible retaining device normally holding the lens forward in the frame, whereby pressure against the lens will permit the same to move rearwardly relative to the frame, substantially as described.

3. An eye protector comprising a frame, a lens slidably mounted within said frame, means bearing against said lens for yieldably supporting the same, and means permitting of the insertion of said last named means within the frame and preventing its accidental removal therefrom.

4. An eye protector comprising a frame, a lens slidably mounted therein and means for permitting of yielding sliding movement of the lens in one direction, said means being detachable from the frame.

5. An eye protector comprising a frame, a lens movable therein and detachable spring means for permitting of yieldable movement of the lens in one direction.

6. An eye protector comprising a tubular frame having an inturned flange, a lens engaging said flange, a coil spring for normally holding said lens in engagement with said flange and permitting of yielding movement of the lens in the opposite direction and supporting means for the spring whereby the spring is detachable from the frame.

In testimony whereof, I affix my signature in the presence of two witnesses.

LUCIAN W. BUGBEE.

Witnesses:
 CARROLL BAILEY,
 JOSEPH J. DEMERS.

Copies of this patent may be obtained for five cents each, by addressing the "Commissioner of Patents. Washington, D. C."